(12) United States Patent
Aharonov et al.

(10) Patent No.: US 9,163,579 B2
(45) Date of Patent: Oct. 20, 2015

(54) PISTON WITH ANTI-CARBON DEPOSIT COATING AND METHOD OF CONSTRUCTION THEREOF

(71) Applicant: Federal-Mogul Corporation, Southfield, MI (US)

(72) Inventors: Robert R. Aharonov, West Bloomfield, MI (US); Eduardo Matsuo, Ann Arbor, MI (US)

(73) Assignee: Federal-Mogul Corporation, Southfield, MI (US)

( * ) Notice: Subject to any disclaimer, the term of this patent is extended or adjusted under 35 U.S.C. 154(b) by 37 days.

(21) Appl. No.: 13/786,156

(22) Filed: Mar. 5, 2013

(65) Prior Publication Data
US 2013/0180494 A1 Jul. 18, 2013

Related U.S. Application Data

(63) Continuation-in-part of application No. 13/304,895, filed on Nov. 28, 2011.

(51) Int. Cl.
*F02F 3/14* (2006.01)
*F02F 3/00* (2006.01)
(Continued)

(52) U.S. Cl.
CPC . *F02F 3/00* (2013.01); *B23P 15/10* (2013.01); *F02F 3/10* (2013.01); *F02F 3/22* (2013.01); *Y10T 29/49265* (2015.01)

(58) Field of Classification Search
CPC ............. F02F 3/00; F02F 3/0084; F02F 3/10; F02F 3/22; F05C 1102/0463; B23P 15/10
USPC ........... 123/193.6, 41.35; 92/223; 29/888.048

IPC ........ F02F 3/00,3/0084, 3/10; F05C 2201/0463
See application file for complete search history.

(56) References Cited

U.S. PATENT DOCUMENTS 2,926,649 A 3/1960 Hicks
4,974,498 A 12/1990 Lemelson
(Continued)

FOREIGN PATENT DOCUMENTS

DE 29619564 U1 * 4/1997
DK 200100148 A 1/2002
(Continued)

OTHER PUBLICATIONS

International Search report PCT/US2012/063482 mailed on Feb. 12, 2013.
(Continued)

*Primary Examiner* — Marguerite McMahon
(74) *Attorney, Agent, or Firm* — Robert L. Stearns; Dickinson Wright, PLLC

(57) ABSTRACT

A piston and method of construction are provided. The piston includes a piston body having an upper combustion surface configured for direct exposure to combustion gases within a cylinder bore with an undercrown surface located beneath the upper combustion surface. The piston body also includes a ring belt region configured for receipt of at least one piston ring adjacent the upper combustion surface with a cooling gallery configured radially inwardly and in substantial radial alignment with the ring belt region. The piston further includes a non-stick material contained in or bonded to at least one of the undercrown surface and at least a portion of the cooling gallery, wherein the non-stick material inhibits the build-up of carbon deposits thereon.

28 Claims, 3 Drawing Sheets

(51) Int. Cl.
*B23P 15/10* (2006.01)
*F02F 3/10* (2006.01)
*F02F 3/22* (2006.01)

(56) References Cited

U.S. PATENT DOCUMENTS

| | | | |
|---|---|---|---|
| 5,014,605 A | 5/1991 | Santi | |
| 5,771,873 A | 6/1998 | Potter et al. | |
| 5,782,945 A * | 7/1998 | Gavin et al. | 65/60.1 |
| 6,656,600 B2 | 12/2003 | Strangman et al. | |
| 7,191,558 B1 | 3/2007 | Conroy et al. | |
| 7,213,586 B2 | 5/2007 | Wilson et al. | |
| 7,383,807 B2 | 6/2008 | Azevedo et al. | |
| 7,556,840 B2 | 7/2009 | Altin | |
| 2003/0051714 A1 | 3/2003 | Bedwell et al. | |
| 2004/0129243 A1* | 7/2004 | Robelet | 123/193.6 |
| 2006/0096557 A1* | 5/2006 | Christain et al. | 123/41.38 |
| 2007/0000468 A1* | 1/2007 | Azevedo et al. | 123/193.4 |
| 2007/0113802 A1 | 5/2007 | Mihara | |
| 2008/0000444 A1* | 1/2008 | Hofmann et al. | 123/193.6 |
| 2009/0241769 A1* | 10/2009 | Feeser | 92/186 |
| 2012/0135270 A1* | 5/2012 | Wilbuer et al. | 428/646 |
| 2013/0025561 A1* | 1/2013 | Gabriel et al. | 123/193.6 |
| 2013/0098267 A1* | 4/2013 | Belashchenko | 106/286.2 |
| 2013/0133609 A1* | 5/2013 | Matsuo | 123/193.6 |

FOREIGN PATENT DOCUMENTS

| | | |
|---|---|---|
| EP | 924310 A1 | 6/1999 |
| EP | 2096290 A1 | 9/2009 |
| GB | 1306470 A | 2/1973 |
| JP | 57179354 A | 11/1982 |

OTHER PUBLICATIONS

International search report mailed Jun. 6, 2014 (PCT/US2014/018573).

* cited by examiner

PISTON WITH ANTI-CARBON DEPOSIT COATING AND METHOD OF CONSTRUCTION THEREOF

CROSS-REFERENCE TO RELATED APPLICATIONS

This application is a continuation-in-part application of U.S. application Ser. No. 13/304,895, filed on Nov. 28, 2012, which is incorporated herein by reference in its entirety.

BACKGROUND OF THE INVENTION

1. Technical Field

This invention relates generally to internal combustion engines, and more particularly to pistons and their method of construction.

2. Related Art

Engine manufacturers are encountering increasing demands to improve engine efficiencies and performance, including, but not limited to, improving fuel economy, improving fuel combustion, reducing oil consumption, and increasing the exhaust temperature for subsequent use of the heat within the vehicle. In order to achieve these goals, the engine running temperature in the combustion chamber needs to be increased. However, while desirable to increase the temperature within the combustion chamber, it remains necessary to maintain the piston at a workable temperature. As such, it is known to incorporate outer and inner cooling galleries, both open and closed, within the piston head through which engine oil is circulated to reduce the operating temperature of the piston head. The outer cooling galleries typically circulates about an upper land of the piston including a ring groove region while the inner cooling gallery is typically beneath an upper combustion surface of the piston head, commonly referred to as undercrown, which commonly includes a recessed combustion bowl. As such, both the ring belt region and the combustion surface benefit from cooling action of the circulated oil. However, over time the circulated oil begins to degrade and oxidize as a result of contacting the high temperature surfaces, and thus, carbon deposits form on the inner surfaces of the upper land and undercrown. As the carbon build-up continues, an insulation layer is formed on the respective surfaces. As such, the cooling effects of the circulated oil are diminished, which in turn leads to surface oxidation and erosion, as well as over tempering of the upper land and combustion surface regions. As such, the mechanical properties of the piston material are diminished, which can lead to crack formation, particularly at high stressed regions, such as a combustion bowl rim.

A piston constructed in accordance with this invention overcomes the aforementioned disadvantages brought on by the formation of carbon build-up by reducing the tendency for oil deposits to accumulate surfaces contacted by cooling oil. As such, a piston constructed in accordance with this invention realizes enhanced running efficiencies, maintains the strength and durability of the base material throughout use and provides an enhanced useful operating life.

SUMMARY OF THE INVENTION

In accordance with one aspect of the invention, a piston for an internal combustion engine is provided. The piston includes a piston body having an upper combustion surface configured for direct exposure to combustion gases within a cylinder bore with an undercrown surface located beneath the upper combustion surface. The piston body also includes a ring belt region configured for receipt of at least one piston ring adjacent the upper combustion surface with a cooling gallery configured radially inwardly and in substantial radial alignment with the ring belt region. The piston further includes a non-stick material contained in or bonded to at least one of the undercrown surface and at least a portion of the cooling gallery, wherein the non-stick material inhibits the build-up of carbon deposits thereon.

In accordance with another aspect of the invention, the piston body includes an upper crown constructed of a first piece of material and a lower crown constructed from a second piece of material separate from the upper crown. The upper crown is fixed to the lower crown and the non-stick material is bonded to at least one of the upper crown and lower crown.

In accordance with another aspect of the invention, the non-stick material is bonded to the upper crown and the lower crown is free of the non-stick material.

In accordance with another aspect of the invention, both the cooling gallery and the undercrown surface have the non-stick material bonded thereto.

In accordance with another aspect of the invention, the piston body is constructed of a steel alloy including the non-stick material as a constituent of the steel alloy.

In accordance with yet another aspect of the invention, a method of constructing a piston for an internal combustion engine is provided. The method includes the following: forming a piston body having an upper combustion surface configured for direct exposure to combustion gases within a cylinder bore and an undercrown surface beneath the upper combustion surface; forming a ring belt region configured for receipt of at least one piston ring adjacent the upper combustion surface; forming a cooling gallery radially inwardly and in substantial radial alignment with the ring belt region; and forming at least one of the undercrown surface and at least a portion of the cooling gallery from a non-stick material selected from the group consisting of pure cobalt, WC—17Co, Co—18Cr—30Mo, or any other alloy containing Cobalt, the non-stick material being resistant to the build-up of carbon deposits thereon.

In accordance with another aspect of the invention, the method includes keeping the lower crown free of the non-stick material.

In accordance with another aspect of the invention, the method includes bonding the non-stick coating material to the undercrown surface and at least a portion of the cooling gallery.

In accordance with another aspect of the invention, the method includes forming the piston body from a steel alloy including the non-stick material as a constituent of the alloy.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
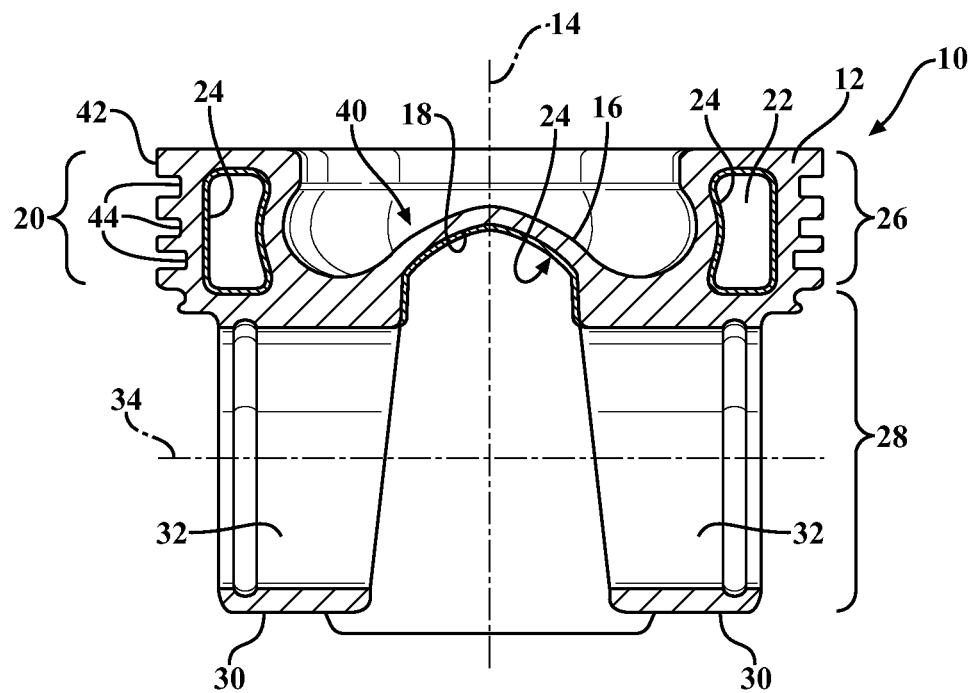
FIG. 1 is a cross-sectional view taken generally along a pin bore axis of a piston constructed in accordance with one aspect of the invention.
Figure 2:
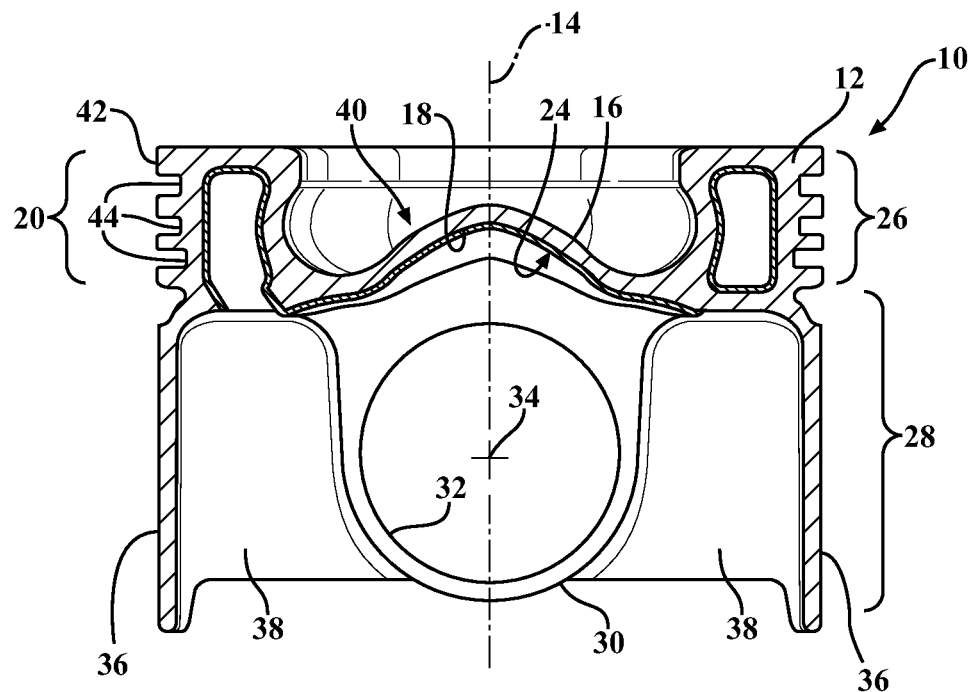
FIG. 2 is a cross-sectional view taken generally transversely to the pin bore of the piston of FIG. 1.
Figure 6:
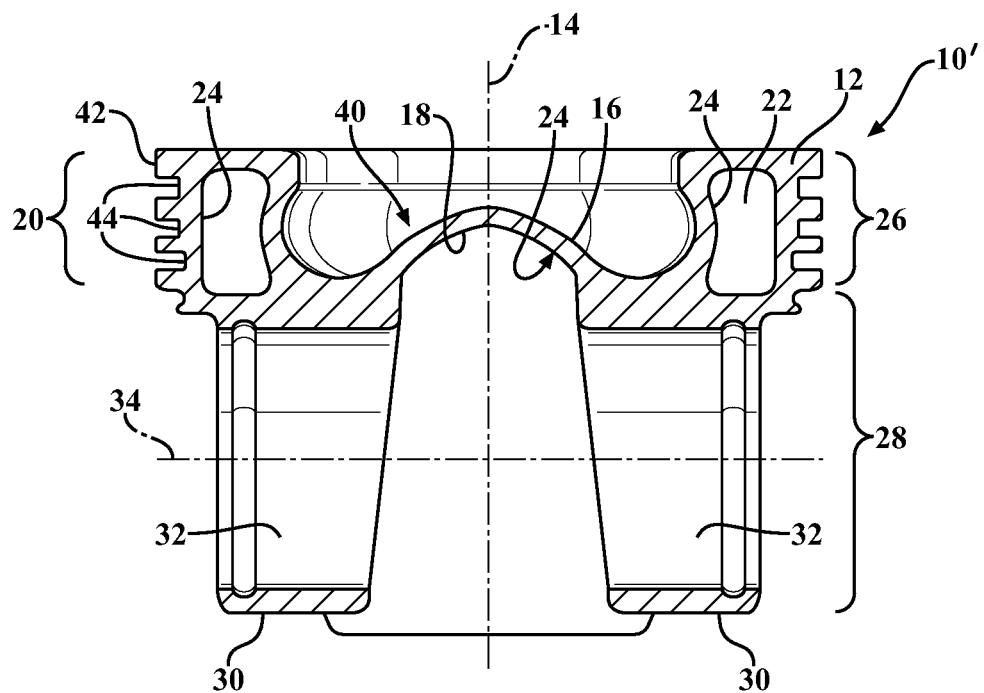
FIG. 6 is a cross-sectional view taken generally along a pin bore axis of a piston constructed in accordance with another aspect of the invention.

Referring in more detail to the drawings, FIGS. 1 and 2 illustrate a piston assembly, referred to hereafter simply as piston 10, constructed according to one presently preferred embodiment of the invention, for reciprocating movement in a cylinder bore or chamber of an internal combustion engine (not shown), such as light vehicle diesel, mid-range diesel, heavy duty and large bore diesel engines, and gas engines, for example. The piston 10 has a piston body 12, shown as a single, monolithic piece of cast material or formed from either forged or billet materials, by way of example, extending along a central longitudinal axis 14 along which the piston 10 reciprocates in the cylinder bore. The body 12 is formed including an upper combustion wall having on one side an upper combustion surface 16 configured for direct exposure to combustion gases within a cylinder bore and on an opposite side an undercrown surface 18 located directly and axially beneath the upper combustion surface 16. The piston body 12 is also formed having a ring belt region 20 adjacent the upper combustion surface 16 wherein the ring belt region 20 is configured for receipt of at least one piston ring (not shown). Further, the piston body 12 is formed including cooling gallery, shown as a closed or substantially closed cooling gallery 22, by way of example. The cooling gallery 22 is configured radially inwardly and in substantial radial alignment with the ring belt region 20. The piston 10 further includes a non-stick coating material 24 contained in or bonded to at least one of the undercrown surface 18 within a central gallery and at least a portion of the cooling gallery 22, wherein the non-stick coating material 24 resists the build-up of carbon deposits thereon. The non-stick coating 24 material, if bonded in place, can be applied via the following processes: plating, thermal spraying, PVD, laser cladding, by way of example and without limitation. Otherwise, if the piston or portions thereof are made of a steel alloy, the non-stick material can be added as a constituent of the composition of the steel alloy (FIG. 6). As such, the build-up of an insulation layer, including carbon deposits from circulating oil, is prevented from forming on the surfaces having the non-stick coating material 24, and thus, the oil circulated through the cooling gallery 22 and against the undercrown surface 18 is able to perform its cooling function, thereby enhancing the performance of the piston 10 and extending its useful life.

The piston body 12 has an upper crown region 26 and a lower crown region 28. The lower crown region 28 provides a pair of pin bosses 30 depending from the upper crown region 26 to provide laterally spaced pin bores 32 coaxially aligned along a pin bore axis 34 that extends generally transverse to the central longitudinal axis 14. The pin bosses 30 are joined to laterally spaced skirt portions 36 via strut portions 38. The skirt portions 36 are diametrically spaced from one another across opposite sides the pin bore axis 34 and have convex outer surfaces contoured for cooperation within the cylinder bore to maintain the piston 10 in a desired orientation as it reciprocates through the cylinder bore.

The upper combustion surface 16 is represented as having a recessed combustion bowl 40 to provide a desired gas flow with the cylinder bore. At least in part due to the combustion bowl 40, relatively thin regions of piston body material are formed between the combustion bowl 40, the cooling gallery 22 and the undercrown surface 18. As such, in use, these regions need to be properly cooled, such as via oil flowing through the cooling gallery 22 and against the undercrown surface 18 with a central gallery region between the pin bosses 30. The undercrown cooling could be provided by oil splashes, oriented cooling oil jets or via oil within the central gallery region. Further, an outer wall 42 of the upper crown region 26 extends downwardly from the upper combustion surface 16. The outer wall 42 is formed having at least one, and shown as a plurality of annular ring groove 44 in the ring belt region 20 for receipt of corresponding piston rings (not shown), wherein the rings typically float freely within their respective ring groove 44. As with the aforementioned relatively thin regions, the annular wall extending between the cooling gallery 22 and the ring belt region 20 is relatively thin, and thus, also needs to be properly cooled during use.

To facilitate proper cooling of the upper combustion surface 16, including the combustion bowl 40, and the ring belt region 20 during use over an extended useful life of the piston 10, the non-stick coating material 24 is present in (piston 10' in FIG. 6) or bonded to at least a portion of surface bounding the cooling gallery 22 and also to the undercrown surface 18. The non-stick coating material 24 is selected from materials that resist the build-up of carbon thereon, including from the group consisting of: chrome, chrome-diamond, nickel, diamond-like coating, chrome-nitride, AlCrN, AlTiN, ceramic, cobalt (including pure cobalt or alloys of cobalt, such as WC—17Co, or Co—18Cr—30Mo, by way of example and without limitation), and polymer materials. In the embodiment shown in FIGS. 1 and 2, the non-stick coating material 24 is bonded about the entire surface bounding the annular cooling gallery 22, or only along the upper part of the cooling gallery 22, with the coating material 24 extending substantially along the length of the ring belt region 20 and also along an upwardly extending portion of the combustion bowl 40. As such, carbon deposits are prevented from accumulating in these regions, thereby preventing an insulation layer including carbon deposits from forming that would otherwise inhibit the cooling effectiveness of the oil circulating through the cooling gallery 22. Thus, by allowing proper cooling to take place via circulated oil, the material of the piston body 12 throughout the region cooled is prevented from becoming weakened via unintended tempering. Accordingly, the material of the piston body 12 retains its high strength and resistance to crack propagation. Further, the piston rings and ring grooves 44 are adequately cooled to prevent carbon build-up thereon, thereby allowing the rings to float and function as intended without becoming seized in their respective ring grooves 44.

In addition to the cooling gallery 22 having a layer of the non-stick coating material 24 present in or bonded thereto, the undercrown surface 18 is shown having a layer of the non-stick coating material 24 present in (piston 10' in FIG. 6) or bonded thereto and extending completely therealong. As such, carbon deposits are prevented from accumulating on the undercrown surface 18, thereby preventing an insulation layer of carbon deposits from forming that would otherwise inhibit the cooling effectiveness of the oil splashing against the undercrown surface 18. Thus, by allowing proper cooling of the upper combustion surface 16, including the entire combustion bowl 40, the material of the piston body 12 in this region is also prevented from becoming weakened via unintended tempering. Accordingly, the material of the upper combustion surface 16 retains its high strength and resistance to crack propagation.

Figure 3:
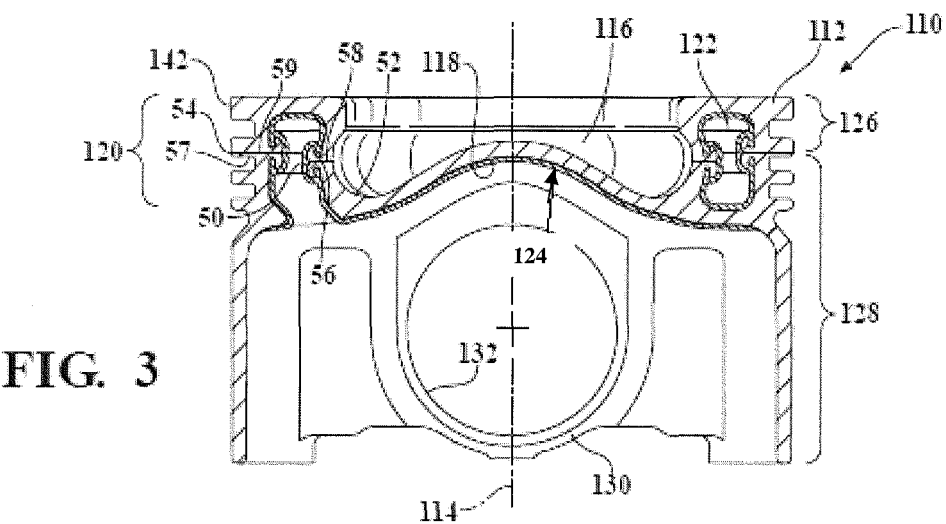
FIG. 3 is a cross-sectional view taken generally transversely to a pin bore of a piston constructed in accordance with another aspect of the invention.

A piston 110 constructed in accordance with another aspect of the invention is shown in FIG. 3, wherein the same reference numerals, offset by a factor of 100, are used to identify like features discussed above. The piston 110 has a piston body 112 including an upper combustion surface 116 represented as having a combustion bowl 140 recessed therein and an undercrown surface 118 beneath the upper combustion surface 116. The piston body 112 also includes a ring belt region 120 adjacent the upper combustion surface 116 with a closed or substantially closed cooling gallery 122 configured radially inwardly and in substantial radial alignment with the ring belt region 120. A non-stick coating material 124 is shown as being bonded to at least one of the undercrown surface 118 and at least a portion of the cooling gallery 122, wherein the non-stick coating material 124 inhibits the build-up of carbon deposits thereon, as discussed above.

The piston body 112 has an upper part, referred to as an upper crown region 126 and a lower part, referred to as a lower crown region 128 extending to a pair of pin bosses 130 having laterally spaced pin bores 132. Unlike the piston 10 discussed above, the upper and lower crown regions 126, 128 are constructed from separate pieces of material and subsequently fixed to one another, such as via a welding or other joining process.

A first weld joint 50 unites a portion of the separately made upper and lower crown regions 126, 128 of the piston 110. The first weld joint 50 extends through an upstanding wall of a combustion bowl 140 above an annular valley 52 of the combustion bowl 140. Thus, the first weld joint 50 is open to the combustion bowl 140 above the valley 52. In addition to the first weld joint 50 extending through the wall of the combustion bowl 140, a second weld joint 54 extends through an outer wall 142 in a ring belt region 120. The upper crown region 126 may thus include a pair of upper joining surfaces, including a radially inner, downwardly facing joining surface 56 and a radially outer, downwardly facing upper joining surface 57 of the ring belt region 120. Meanwhile, the lower crown region 128 may thus include a pair of lower joining surfaces, including a radially inner, upwardly facing lower surface 58 and a radially outer, upwardly facing lower joining surface 59. The associated lower and upper joining surfaces 56, 57; 58, 59 may be united by a selected joining process, such as induction welding, friction welding, resistance welding, charge carrier rays, electron beam welding, laser welding, stir welding, brazing, soldering, hot or cold diffusion, etc.

The upper crown region 126 provides an upper portion of the cooling gallery 122, having a generally U-shape in cross-section taken along a central longitudinal axis 114 of the piston 110. The lower crown region 128 provides a lower portion of the cooling gallery 122, having a generally U-shape in cross-section taken along the central longitudinal axis 114 and also the wall of the upper combustion surface 116 and undercrown surface 118. Accordingly, prior to joining the upper crown region 126 to the lower crown region 128, the non-stick coating material 124 can be bonded to the desired surfaces of the separate upper and lower parts 126, 128, including the undercrown surface 118 and/or one or both of the generally U-shaped surfaces bounding the cooling gallery 122, shown in FIG. 3 as both generally U-shaped surfaces. As such, with the non-stick coating material 124 being bonded to both generally U-shaped surfaces, the entire or upper part of the cooling gallery 122 is coated and thus, the entire upstanding surfaces running along both the upper combustion surface and the ring belt region 120 are coated. Accordingly, carbon deposits are prevented from forming an insulation layer in these regions, thus allowing these regions to be properly cooled by circulating oil in the cooling gallery 122.

Figure 4:
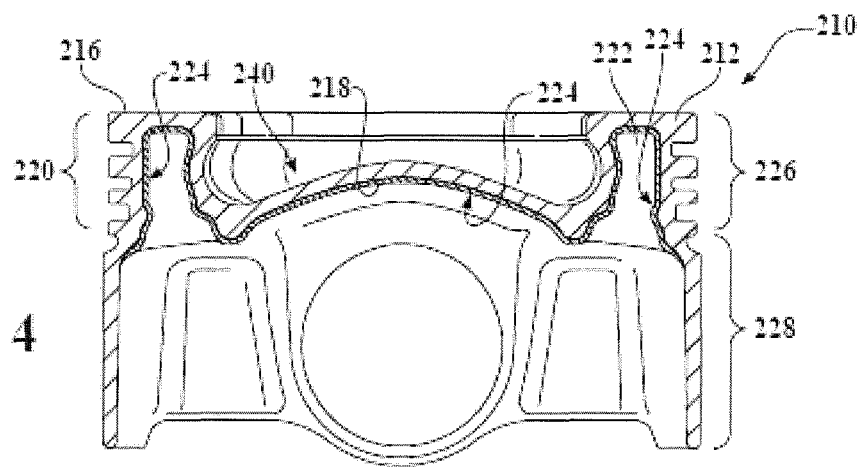
FIG. 4 is a cross-sectional view taken generally transversely to a pin bore of a piston constructed in accordance with yet another aspect of the invention.

A piston 210 constructed in accordance with another aspect of the invention is shown in FIG. 4, wherein the same reference numerals, offset by a factor of 200, are used to identify like features discussed above. The piston 210 has a piston body 212 including an upper combustion surface 216 represented as having a combustion bowl 240 recessed therein and an undercrown surface 218 beneath the upper combustion surface 216. The piston body 212 also includes a ring belt region 220 adjacent the upper combustion surface 216. Overall, the piston body 212 is configured similarly as the piston body 112 illustrated in FIG. 3, however, rather than being constructed from separate pieces of material, it is constructed as a single monolithic piece of material. Further, rather than having a closed or substantially closed cooling gallery, the piston body 212 has an "open" cooling gallery 222 configured radially inwardly and in substantial radial alignment with the ring belt region 220. By being referred to as an "open" means that the cooling gallery 222 is open along its lower portion, and thus, does not include a floor as in the previous embodiments. A non-stick coating material 224 is shown as being bonded to at least one of the undercrown surface 218 and the cooling gallery 222, shown as both, wherein the non-stick coating material 224 inhibits the build-up of carbon deposits thereon, as discussed above. As shown, the non-stick coating material 224 extends along the undercrown surface 218 and the surface bounding the cooling gallery 222 as a continuous, uninterrupted coating layer. In case the coating is applied via a thermal spray method, the coating will be bonded preferentially along a gallery area perpendicular to the spray direction.

Figure 5:
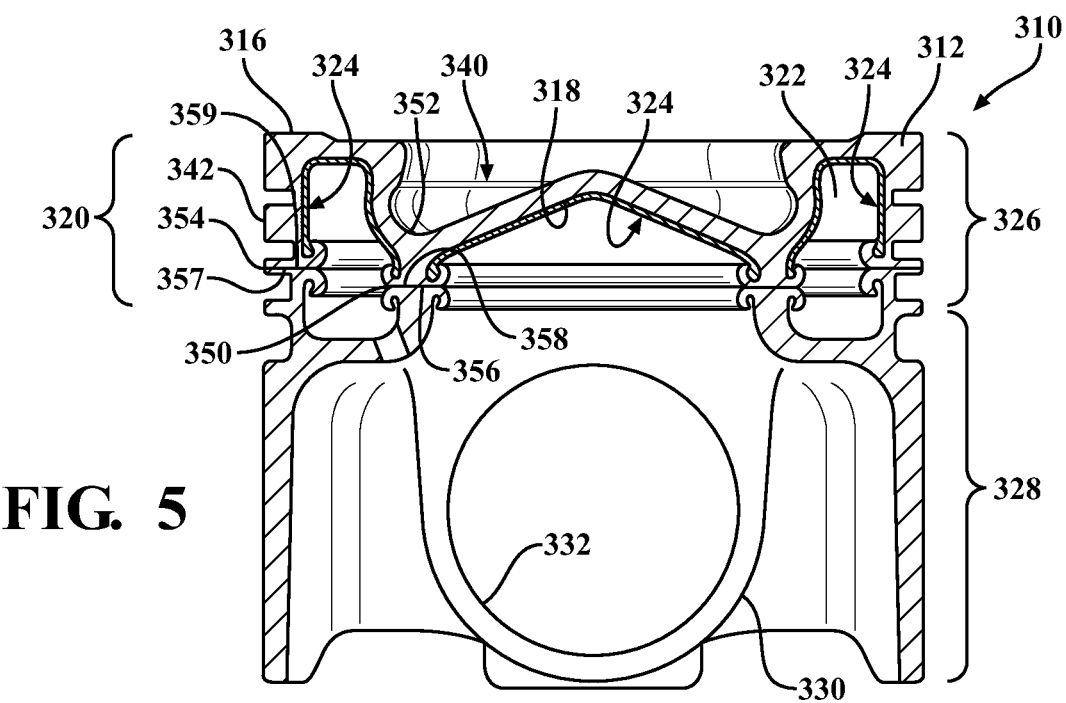
FIG. 5 is a cross-sectional view taken generally transversely to a pin bore of a piston constructed in accordance with yet another aspect of the invention.

A piston 310 constructed in accordance with another aspect of the invention is shown in FIG. 5, wherein the same reference numerals, offset by a factor of 300, are used to identify like features discussed above. The piston 310 has a piston body 312 including an upper combustion surface 316 represented as having a combustion bowl 340 recessed therein and an undercrown surface 318 beneath the upper combustion surface 316. The piston body 312 also includes a ring belt region 320 adjacent the upper combustion surface 316 with a closed or substantially closed cooling gallery 322 configured radially inwardly and in substantial radial alignment with the ring belt region 320. A non-stick coating material 324 is shown as being bonded to at least one of the undercrown surface 318 and at least a portion of the cooling gallery 322, wherein the non-stick coating material 324 inhibits the build-up of carbon deposits thereon, as discussed above.

The piston body 312, as discussed for the piston body 112 of FIG. 3, has an upper part, referred to as an upper crown region 326 and a lower part, referred to as a lower crown region 328 extending to a pair of pin bosses 330 having laterally spaced pin bores 332. The upper and lower crown regions 326, 328 are constructed from separate pieces of material and subsequently fixed to one another.

A first weld joint 350 unites a portion of the separately made upper and lower crown regions 326, 328 of the piston 310. However, unlike the piston 110, the first weld joint 350 does not extend through an upstanding wall of a combustion bowl 340 above an annular valley 352 of the combustion bowl 340, but rather, the first weld joint 350 is formed beneath the combustion bowl 340. The combustion bowl 340 is formed entirely of the material of the upper crown region 326, including the upstanding wall of the combustion bowl. In addition to the first weld joint 350, a second weld joint 354 extends through an outer wall 342 in a ring belt region 320. The upper crown region 326 may thus include a pair of upper joining surfaces, including a radially inner, downwardly facing joining surface 356 extending below the combustion bowl 340 and a radially outer, downwardly facing upper joining surface 357 within the ring belt region 320. Meanwhile, the lower crown region 328 may thus include a pair of lower joining surfaces, including a radially inner, upwardly facing lower surface 358 and a radially outer, upwardly facing lower joining surface 359. The associated lower and upper joining surfaces 356, 357; 358, 359 may be united by a selected joining process, such as induction welding, friction welding, resistance welding, charge carrier rays, electron beam welding, laser welding, stir welding, brazing, soldering, hot or cold diffusion, etc.

The upper crown region 326 provides an upper portion of the cooling gallery 322, having a generally U-shape in cross-section taken along a central longitudinal axis 314 of the piston 310. The lower crown region 328 provides a lower portion of the cooling gallery 322, having a generally U-shape in cross-section taken along the central longitudinal axis 314. Accordingly, prior to joining the upper crown region 326 to the lower crown region 328, the non-stick coating material 324 can be bonded to the desired surfaces of the separate upper and lower parts 326, 328, including the undercrown surface 318 and/or one or both of the generally U-shaped surfaces bounding the cooling gallery 322, shown in FIG. 5 as only the generally U-shaped surface bounding the upper portion of the cooling gallery 322. As such, only the upper portion of the cooling gallery 322, which includes a portion extending along the combustion bowl 340, while the lower portion of the cooling gallery 322 provided by the lower part 328 remains free from the coating material 324. Accordingly, in manufacture, the non-stick coating material 324 can be bonded to the desired surfaces on the upper part 326, while the lower part 328 can remain uncoated. Thus, the non-stick coating material 324 is applied as needed, without waste, to the areas desired.

Obviously, many modifications and variations of the present invention are possible in light of the above teachings. It is, therefore, to be understood that within the scope of the appended claims, the invention may be practiced otherwise than as specifically described.

What is claimed is:

1. A piston for an internal combustion engine, comprising: a piston body formed of steel alloy, said piston body having an upper combustion surface configured for direct exposure to combustion gases within a cylinder bore with an undercrown surface beneath said upper combustion surface and having a ring belt region configured for receipt of at least one piston ring adjacent said upper combustion surface with a cooling gallery configured radially inwardly from said ring belt region and in substantial radial alignment with said ring belt region; and a non-stick material contained in or bonded to the portion of said steel alloy forming at least one of said undercrown surface and at least a portion of said cooling gallery for preventing carbon deposits from forming on said at least one of said undercrown surface and at least a portion of said cooling gallery when oil contacts said at least one of said undercrown surface and at least a portion of said cooling gallery, said non-stick material including cobalt.

2. The piston of claim 1 wherein said non-stick material is bonded to said undercrown surface and at least a portion of said cooling gallery.

3. The piston of claim 1 wherein said piston body is constructed as a monolithic piece of material.

4. The piston of claim 3 wherein said cooling gallery is a closed gallery.

5. The piston of claim 1 wherein said non-stick material is pure cobalt.

6. The piston of claim 1 wherein said piston body includes an upper crown constructed of a first piece of material and a lower crown constructed from a second piece of material separate from said upper crown, said upper crown being fixed to said lower crown and said non-stick material being bonded to at least one of said upper crown and said lower crown.

7. The piston of claim 6 wherein said lower crown is free of said non-stick material.

8. The piston of claim 7 wherein said non-stick material is bonded to said undercrown surface and at least a portion of said cooling gallery.

9. The piston of claim 8 wherein said cooling gallery is a closed gallery.

10. The piston of claim 6 wherein said non-stick material is bonded to said upper crown and said lower crown.

11. The piston of claim 1 wherein said piston body is constructed of a steel alloy including said non-stick material as a constituent of said steel alloy.

12. The piston of claim 1 wherein said non-stick material is Wc-17Co.

13. The piston of claim 1 wherein said non-stick material is Co-18Cr-30Mo.

14. The piston of claim 1 wherein said non-stick material is a Co-containing alloy.

15. The piston of claim 1 including oil contacting said non-stick coating material contained in bonded to the material forming said at least one of said undercrown surface and at least a portion of said cooling gallery.

16. A method of constructing a piston for an internal combustion engine, comprising:
forming a piston body of a steel alloy, the piston body having an upper combustion surface configured for direct exposure to combustion gases within a cylinder bore and an undercrown surface beneath the upper combustion surface;
forming a ring belt region configured for receipt of at least one piston ring adjacent the upper combustion surface;
forming a cooling gallery radially inwardly and in substantial radial alignment with the ring belt region; and
forming at least one of the undercrown surface and at least a portion of the cooling gallery from a non-stick material including cobalt for preventing carbon deposits from forming on the at least one of the undercrown surface and at least a portion of the cooling gallery when cooling oil contacts the at least one of the undercrown surface and at least a portion of the cooling gallery, such that the non-stick material is contained in or bonded to the portion of the steel alloy forming the at least one of the undercrown surface and at least a portion of the cooling gallery.

17. The method of claim 16 further including forming the piston body as a monolithic piece of material.

18. The method of claim 17 further including forming the cooling gallery as a closed gallery and bonding the non-stick material in the cooling gallery.

19. The method of claim 16 further including forming the piston body having an upper crown and a lower crown constructed from separate pieces of material separate and fixing the upper crown to the lower crown.

20. The method of claim 19 further including keeping the lower crown free of the non-stick material.

21. The method of claim 20 further including bonding the non-stick material to the undercrown surface and at least a portion of the cooling gallery.

22. The method of claim 16 further including forming the piston body from a steel alloy including the non-stick material as a constituent of the alloy.

23. The method of claim 16 wherein the non-stick material is pure cobalt.

24. The method of claim 16 wherein the non-stick material is WC-17Co.

25. The method of claim 16 wherein the non-stick material is Co-18Cr-30Mo.

26. The method of claim 16 wherein the non-stick material is a Co-containing alloy.

27. A method for cooling a piston disposed in a running internal combustion engine, comprising the steps of:

providing a piston body formed of a steel alloy, the piston body having an upper combustion surface configured for direst exposure to combustion gases within a cylinder bore with an undercrown surface beneath the upper combustion surface and having a ring belt region configured for receipt of at least one piston ring adjacent the upper combustion surface with a cooling gallery configured radially inwardly from the ring belt region, and a non-stick material including cobalt contained in or bonded to the portion of the steel alloy forming at least one of the undercrown surface and at least a portion of the cooling gallery; and applying cooling oil to the non-stick coating contained in or bonded to the at least one of the undercrown surface and at least a portion of the cooling gallery.

28. The method of claim 27 including disposing the piston in the internal combustion engine, and wherein the step of applying the cooling oil to the non-stick coating occurs while the engine is running.

* * * * *

UNITED STATES PATENT AND TRADEMARK OFFICE
CERTIFICATE OF CORRECTION

| | | |
|---|---|---|
| PATENT NO. | : 9,163,579 B2 | Page 1 of 1 |
| APPLICATION NO. | : 13/786156 | |
| DATED | : October 20, 2015 | |
| INVENTOR(S) | : Robert R. Aharonov and Eduardo Matsuo | |

It is certified that error appears in the above-identified patent and that said Letters Patent is hereby corrected as shown below:

In the Specification:

In column 1, line 9, please change "2011" to --2012--.

In the Claims:

In column 8, line 30, please change "Wc-17Co." to --WC-17Co.--.

In column 8, line 36, please change "in bonded" to --in or bonded--.

In column 8, line 56, please change "," to --;--.

In column 10, line 3, please change "direst" to --direct--.

Signed and Sealed this
Eighth Day of March, 2016

Michelle K. Lee
*Director of the United States Patent and Trademark Office*